United States Patent
Ruben

Patent Number: 5,915,136
Date of Patent: Jun. 22, 1999

[54] REAL-IMAGE VIEWFINDER WITH STATIONARY AND MOVABLE REAL IMAGE PLANES

[75] Inventor: Paul L. Ruben, Penfield, N.Y.

[73] Assignee: Eastman Kodak Company, Rochester, N.Y.

[21] Appl. No.: 07/975,764

[22] Filed: Nov. 13, 1992

[51] Int. Cl.⁶ ............................ G03B 13/08; G03B 13/10
[52] U.S. Cl. ........................... 396/379; 382/384; 382/386
[58] Field of Search ................................. 354/219–225, 354/465; 359/676, 677, 678; 396/373, 378, 379, 382, 384, 385, 386

[56] References Cited

U.S. PATENT DOCUMENTS

| | | | |
|---|---|---|---|
| 3,057,249 | 10/1962 | Miles | 354/219 |
| 3,455,220 | 7/1969 | Dietz | 354/469 |
| 3,690,214 | 9/1972 | Ataka | 354/225 |
| 4,165,932 | 8/1979 | Asano et al. | 354/225 X |
| 4,527,875 | 7/1985 | Shibata | 354/225 |
| 4,557,578 | 12/1985 | Seely | 354/225 X |
| 4,949,118 | 8/1990 | Yamamoto et al. | 354/475 |
| 4,972,216 | 11/1990 | Ueda et al. | 354/225 |
| 4,993,819 | 2/1991 | Moorhouse | 350/557 |
| 5,111,228 | 5/1992 | Hansen | 354/222 |
| 5,144,349 | 9/1992 | Kato et al. | 354/222 |
| 5,155,517 | 10/1992 | Bentensky et al. | 354/222 |
| 5,170,204 | 12/1992 | Mukai et al. | 354/409 |
| 5,182,592 | 1/1993 | Bentensky et al. | 354/221 |
| 5,202,714 | 4/1993 | Iwata | 354/219 |

*Primary Examiner*—Safet Metjahic
*Assistant Examiner*—J. K. Han
*Attorney, Agent, or Firm*—Gordon M. Stewart

[57] ABSTRACT

A real image viewfinder includes an objective lens, a variator, an image reflecting optic unit, and an eyepiece lens that define a first optical path in which a first real image plane is located between the objective lens and the eyepiece lens, and can be viewed through the eyepiece lens. The reflecting optic unit is movable to compensate for variations in the position of the first real image focal plane such that the real image focal plane moves simultaneously with movement of the reflecting optic unit and also is adapted to define a second optical path through the viewfinder such that a second real image plane is located at the focal plane of the eyepiece lens, where an information display can be located.

5 Claims, 3 Drawing Sheets

REAL-IMAGE VIEWFINDER WITH STATIONARY AND MOVABLE REAL IMAGE PLANES

BACKGROUND OF THE INVENTION

1. Field of the Invention

This invention relates generally to photographic cameras and, more particularly, to real-image viewfinders for photographic cameras.

2. Description of the Related Art

It is desirable for a camera to provide a viewfinder device that permits a photographer to view an object whose image is to be recorded by the camera. In a photographic camera with through-the-lens viewing, a real image of the object is formed at a focusing screen and is reflected through the viewfinder to the photographer. A mirror is located in the exposure optical path to reflect the object image to the focusing screen and permit viewing the image of the object, and is moved out of the exposure path when the film shutter is opened. A through-the-lens viewing system thereby permits the photographer to see actual changes in focus and magnification of the object image up to the instant of exposure, but unfortunately such viewing systems can be heavy, complex, and relatively expensive to produce.

Savings in weight, complexity, and cost can be realized by eliminating the through-the-lens viewing system and providing a viewing system having an optical path separate from the exposure path. Viewfinders of the Galilean type provide a real image of the object to be photographed and can be adapted to permit changing the viewfinder focus, with which the photographer can see changes in focus of the camera lens, and to permit continuously changing the viewfinder field of view, which is commonly referred to as a zoom function. Such a viewfinder system is described, for example, in U.S. Pat. No. 5,155,517 entitled Real Image Zoom Viewfinder, of which the present applicant is a co-inventor.

A telescopic viewfinder generally includes at least an objective lens of positive focal length located nearest an object to be photographed, an eyepiece lens through which the photographer views the real image, and a reflecting optical unit that erects and reverses the image of the object. The objective lens may be a zoom lens of variable focal length. The real image is formed in the viewfinder optical path between the objective lens and the eyepiece lens. If the objective lens is a zoom lens including a variator but no compensator, then the location of the real image is shifted along the length of the optical path as the focal length and field of view are changed.

It is desirable for a camera viewfinder to provide information in the viewfinder in addition to the object image. For example, photographers prefer a viewfinder display that includes a central focus aid and that shows information such as shutter speed, aperture setting, exposure, focus information, and the like. In a telescopic viewfinder, such information can be viewed by the photographer if a display is placed at the plane of the real image. Reading the display at the real image plane is difficult, however, if the position of the real image is shifted as the focal plane position of the zoom objective lens and field of view are changed. For a simple zoom objective lens without compensation for focal plane shift, the real image will drift through the focal plane of the eyepiece lens while the display remains stationary at the eyepiece lens focal plane, or if compensation is provided by moving reflective surfaces to position the focal plane formed by the objective lens at a constant distance from the eyepiece lens, the display must be adapted to move with the real image plane to stay in the focal plane of the eyepiece lens.

Another difficulty encountered with the display of information in a real image viewfinder is attempting to maintain a constant ratio of illumination of the scene to illumination of the information. The displayed information should be sufficiently bright to be easily read by the photographer. If the information is illuminated with an auxiliary light, however, it can be difficult to read because of the disparity in the light level between the object being viewed under a variety of ambient lighting conditions and the display being illuminated at a constant level of brightness.

From the discussion above, it should be apparent that there is a need for a viewfinder that provides a real image of the object to be photographed and displays information in the viewfinder that easily can be read by a photographer as the viewfinder objective lens focus and field of view are changed and as scene brightness varies. The present invention satisfies this need.

SUMMARY OF THE INVENTION

The present invention provides a real image viewfinder having a zoom objective lens with a variator lens, an image reflecting optic unit, and an eyepiece lens that define a first optical path, configured such that a first real image plane is located between the objective lens and the eyepiece lens and can be viewed through the eyepiece lens, and configured such that the image reflecting optic unit is movable to compensate for focus shift of the objective lens and move the first real image plane concurrently with movement of the image reflecting optic unit, wherein the image reflecting optic unit is adapted to define a second optical path through the viewfinder such that a second real image plane is fixedly located at the focal plane of the eyepiece lens. In this way, a display can be located at the stationary second real image plane to provide information to the photographer that can be read as the focal plane position and field of view of the zoom viewfinder are changed. Thus, the display remains in focus as the viewfinder objective lens focal plane position and field of view are changed.

A viewfinder in accordance with the present invention includes an image reflecting optic unit with reflecting surfaces that erect and invert the object image, with at least one of the reflecting surfaces being adapted to allow viewing of the second real image plane by the eyepiece lens. For example, the image reflecting optic unit can comprise a Type-2 Porro prism assembly in which one of the reflecting surfaces is semi-transparent so that the movable first real image is reflected to the eyepiece lens for viewing and the stationary second real image can be viewed through the eyepiece lens in an undeviated, straight line-of-sight. Alternatively, one of the reflecting surfaces in the reflecting optic unit can be sized sufficiently small so the stationary second real image plane can be placed outside the viewfinder field of view so the eyepiece lens can view the second real image in an undeviated, straight line-of-sight around the reflecting surface. In either case, the real image of the object to be photographed can be shifted along the first viewfinder optical path as the focus and magnification are adjusted for viewing by the photographer via the first optical path, while a display can be located at the stationary second real image plane for viewing by the photographer via the second optical path.

In another aspect of the invention, the second real image plane can be located at the front of the viewfinder near the objective lens and the display can comprise a clear legend in a black surround. In this way, the display legend is illuminated solely with light passing through the viewfinder and is of substantially the same brightness as the scene to be photographed. This assures a constant ratio of the illumination level of the scene compared with the illumination level of the display, making the display easily visible to the photographer.

Other features and advantages of the present invention should be apparent from the following description of the preferred embodiments, which illustrate, by way of example, the principles of the invention.

DESCRIPTION OF THE PREFERRED EMBODIMENTS

Figure 1:
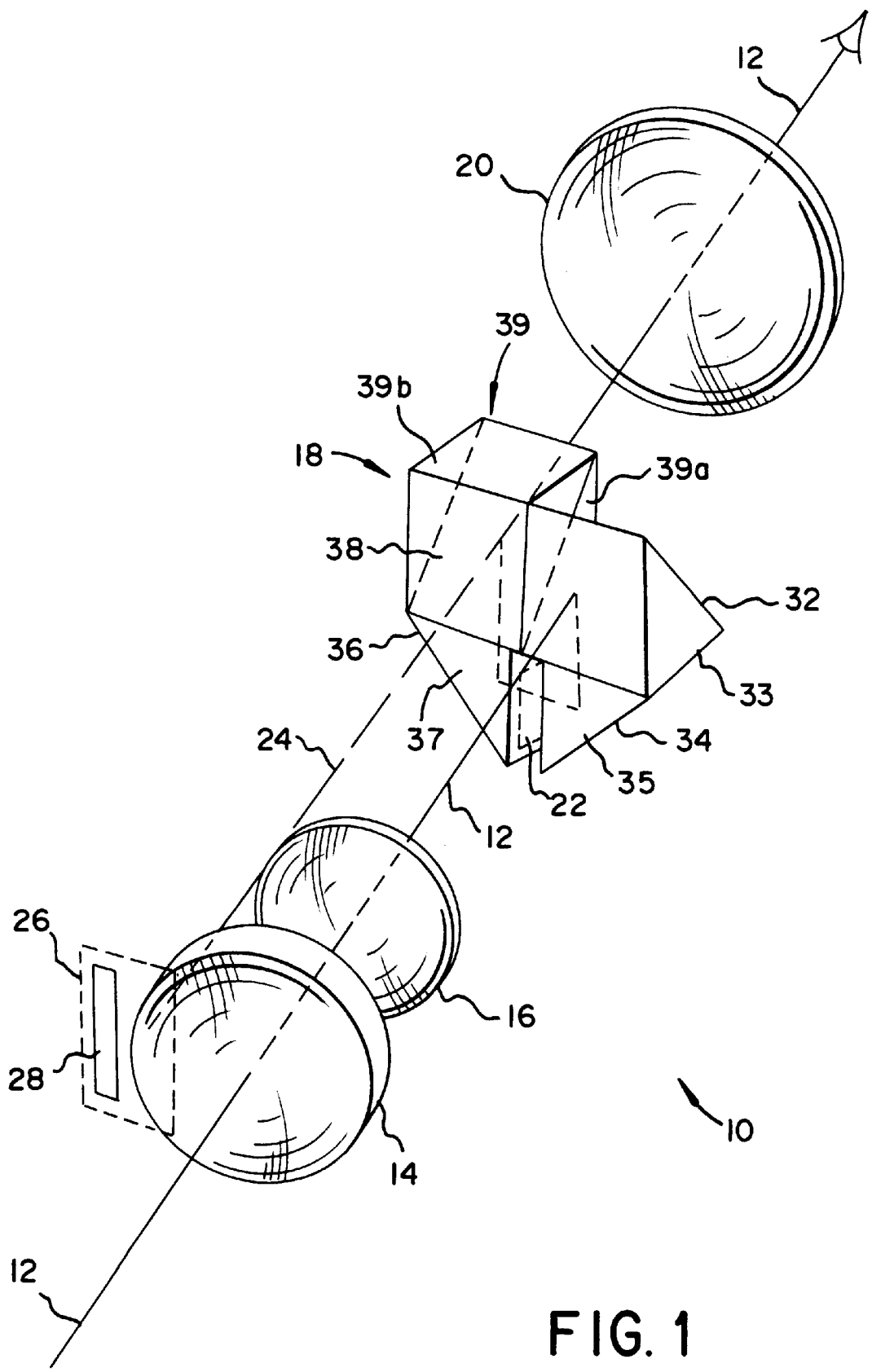
FIG. 1 is a perspective view of a viewfinder optic system constructed in accordance with the present invention.
Figure 2:
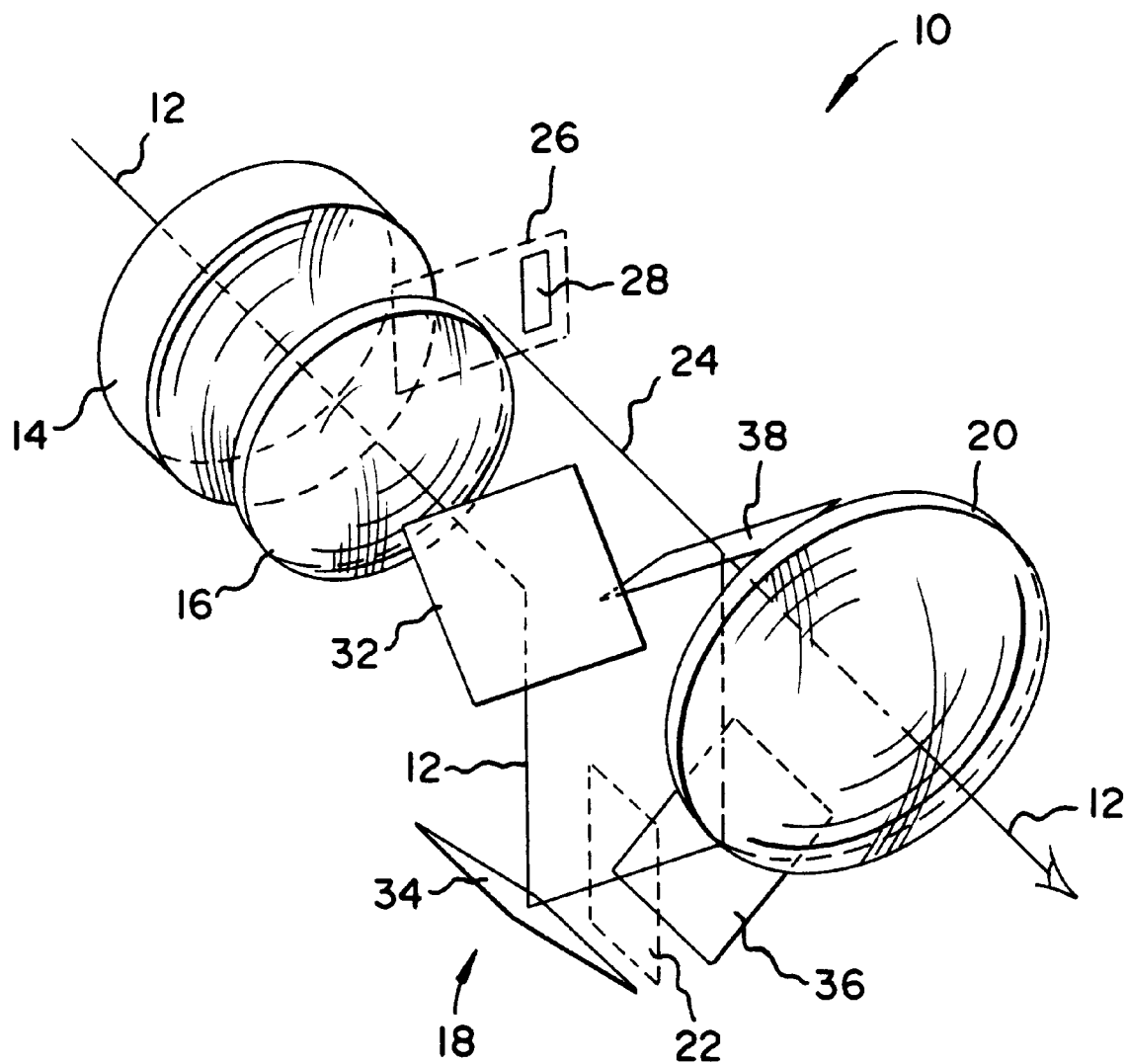
FIG. 2 is a perspective view of the viewfinder optic system illustrated in FIG. 1 showing the reflecting surfaces of the reflecting optic unit in schematic.

With reference to FIGS. 1 and 2, a viewfinder optical system 10 in accordance with the present invention for use in a photographic camera has a first optical path 12 and includes an objective lens 14, a variator lens 16, an image reflecting optic unit 18, and an eyepiece lens 20. A first real image plane 22 is located between the objective lens and the eyepiece lens, moves along the first optical path 12 as the viewfinder focus is adjusted, and can be viewed through the eyepiece lens 20. A second optical path 24 extends from the front of the viewfinder near the objective lens 14 in an undeviated, straight line-of-sight to the eyepiece lens. A second real image plane 26 is located in the second optical path at a distance equal to the eyepiece lens 20 back focal length, is stationary, and can be viewed by a photographer through the eyepiece lens. A display 28 is located at the second real image plane to provide focus information, shutter speed, and the like, which then can be viewed by the photographer. Thus, the viewfinder 10 provides an optical system separate from the camera exposure optical system and further provides two optical paths, having first and second real image planes, respectively, one of which moves with the variable position of the variator, and the other of which is stationary.

In the preferred embodiment illustrated in FIGS. 1 and 2, the image reflecting optic unit 18 comprises a Type-2 Porro prism assembly having a first reflecting surface 32, a second reflecting surface 34, a third reflecting surface 36, and a fourth reflecting surface 38. The reflecting surfaces are shown schematically in FIG. 2 to better illustrate the optical path 12. The spacing between the reflecting surfaces is exaggerated in FIGS. 1 and 2 to permit better illustration of the first real image plane 22.

As noted, the image reflecting optic unit 18 is a prism assembly. Each of the reflecting surfaces 32, 34, 36, and 38 is associated with at least one prism of the image reflecting optic unit. For example, the first reflecting surface 32 is associated with a first prism 33, the second reflecting surface 34 is associated with a second prism 35, and the third reflecting surface 36 is associated with a third prism 37. The fourth reflecting surface 38 is associated with a cube beamsplitter 39 having a lower fourth prism 39a and an upper fifth prism 39b, as indicated in FIG. 1. The cube beamsplitter is used in the FIG. 1 embodiment because the fourth reflecting surface 38 is a semi-transparent surface and therefore, to avoid light scattering, requires that the distance travelled by light along the reflected line-of-sight associated with the fourth reflecting surface through the lower prism 39a is equal to the distance travelled by light along the straight line-of-sight associated with the lower prism 39a and upper prism 39b. Thus, the upper prism 39b ensures that the optical distance travelled by light reflected through the beamsplitter from the third prism 37/cube beamsplitter 39 interface to the fourth reflecting surface 38 and to the beamsplitter-to-air interface nearest the eyepiece lens 20 is equal to the optical distance straight through the beamsplitter from the beamsplitter-to-air interface nearest the second real image plane 26 through the fourth reflecting surface to the opposite beamsplitter-to-air interface nearest the eyepiece lens. The details of such a construction will be known to those skilled in the art and require no further explanation.

With respect to operation of the viewfinder optical system 10, the variator lens 16 is moved along the first optical path 12 to adjust magnification of the image of the object. The second and third reflecting surfaces 34 and 36, respectively, move vertically in FIG. 1 along the first optical path 12 to compensate for variation of the position of the real image focal plane as the variator lens is moved to adjust the field of view. The fourth reflecting surface 38 is adapted to define the second optical path 24 by being made semi-transparent to permit the second real image plane 26 to be viewed through the eyepiece lens 20 and through the fourth reflecting surface 38 in an undeviated, straight line-of-sight and to permit the first real image plane 22 to be reflected by the fourth reflecting surface and viewed through the eyepiece lens.

Thus, the second reflecting surface 34 and third reflecting surface 36 maintain the constant distance from the eyepiece lens 20 to the first real image plane 22 when they are moved vertically and therefore compensate for the variable position of the first real image plane formed at the focal length of the objective lens 14. The second real image plane 26 is stationary during movement of the second and third reflecting surfaces and during movement of the variator lens 16. Therefore, a display can be located at the second real image plane without concern for focus compensation of the objective lens.

In particular, the first real image plane 22 can be viewed through the eyepiece lens 20 by virtue of being reflected by the fourth reflecting surface 38, while at the same time the second real image plane 26 can be viewed in an undeviated, straight line-of-sight from the eyepiece lens 20 through the semi-transparent fourth reflecting surface 38 to the second real image plane 26 along the second optical path 24. It should be clear from FIGS. 1 and 2 that the first and second optical paths 12 and 24, respectively, are coincident from the fourth reflecting surface 38 through the eyepiece lens 20. Because the second real image plane 26 is located at a distance equal to the focal length of the eyepiece lens, the display 28 remains in focus as the reflecting optic unit 18 is adjusted to compensate for the variable position of the real image focal plane and as the variator lens 16 is moved to adjust magnification of the viewfinder objective lens real image.

Figure 3:
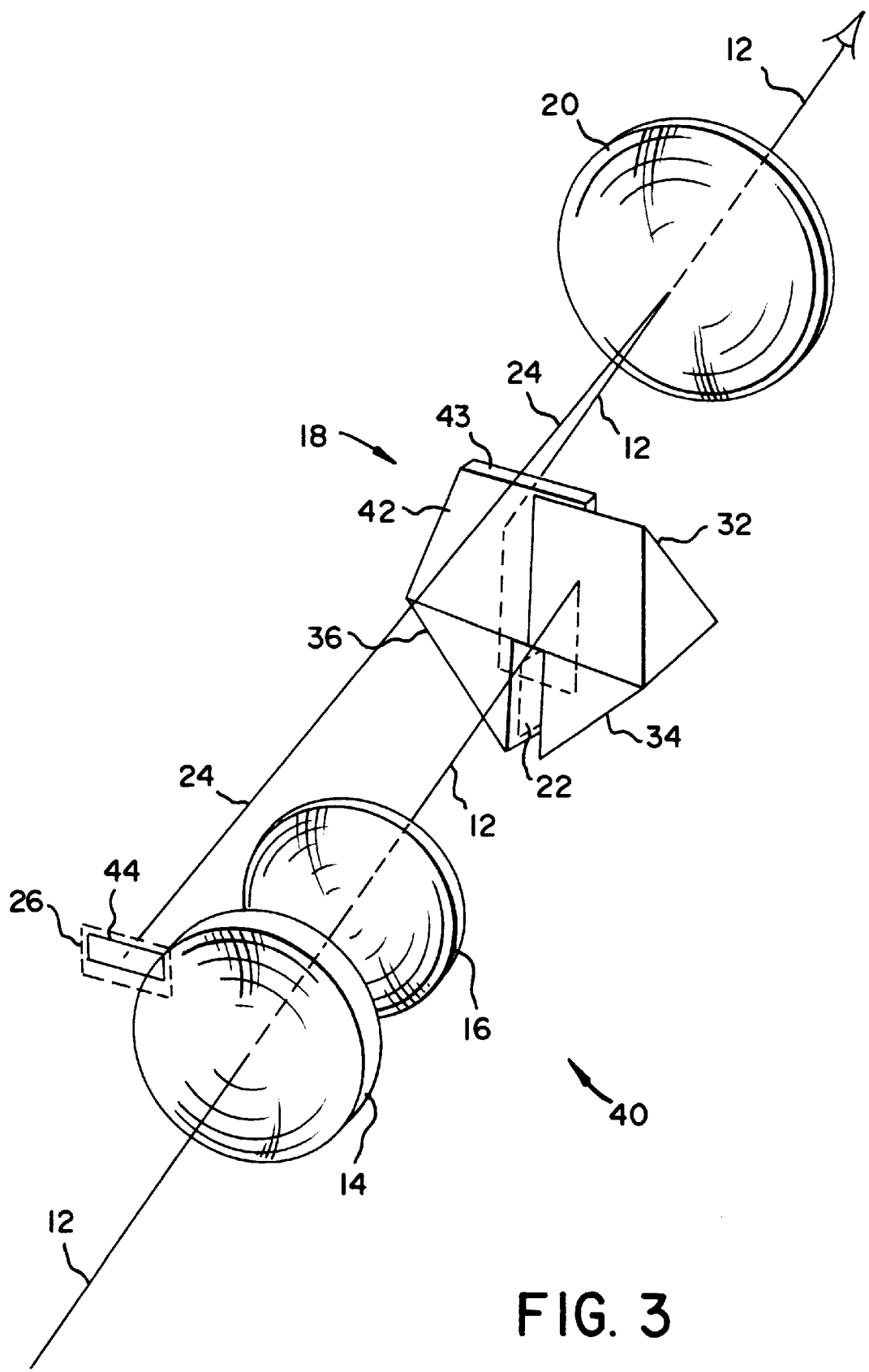
FIG. 3 is a perspective view of a second embodiment of a viewfinder optic system constructed in accordance with the present invention.

FIG. 3 illustrates another embodiment of the present invention and shows a real image viewfinder 40 having an objective lens 14, a variator lens 16, an image reflecting optic unit 18, and an eyepiece lens 20, as discussed above in connection with FIGS. 1 and 2. In the FIG. 3 embodiment, however, the reflecting optic unit 18 does not include a semi-transparent fourth reflecting surface. Rather, the reflecting optic unit of FIG. 3 includes a fourth reflecting surface 42 that is adapted to define the second optical path 24 by being sized sufficiently to permit the second real image plane 26 to be viewed in an undeviated, straight line along the second optical path from the real image plane 26, outside the viewfinder field of view, to the eyepiece lens 20. In particular, the height of the fourth reflecting surface 42 is truncated, forming a flat top surface 43 of the Porro prism assembly 18, to allow the second optical path to extend from the stationary second real image lane 26 to the eyepiece lens 20 in an undeviated straight path. Again, an information display 44 can be included at the second real image plane 26 for viewing by the photographer. The display 44 shown in FIG. 3 is illustrated with a different orientation from the display 28 shown in FIG. 1, but it is to be understood that either display orientation can be used in either illustrated embodiment.

In another aspect of the invention, the information display 28 shown in FIGS. 1 and 2 and the information display 44 shown in FIG. 3 are constructed from a transparent film layer, such as a thin plastic, and comprise a clear legend in a black surround. The legend, for example, can consist of shutter speed numbers, focus information, aperture f-stop numbers, film frame numbers, and the like. Because the displays 28 and 44 are located at the front of the viewfinder 10, near the objective lens 14, the display is back-lit with light entering the viewfinder from the object being viewed. This makes the display legend appear as characters having a brightness substantially equal to the brightness of the object being viewed, thereby making the characters easy to read despite variations in ambient scene illumination.

Thus, the present invention provides a real image viewfinder having a movable first real image plane position located along a first optic path between the objective lens and eyepiece lens of the viewfinder, wherein the position of the first real image plane shifts along the viewfinder optic path as the magnification and field of view are adjusted, and includes an image reflecting optic unit adapted to define an undeviated second optical path through the viewfinder such that a second real image plane is located along the second optic path at the focal length of the eyepiece lens, where a viewfinder information display can be located. The information display remains in focus as the viewfinder objective lens focal plane position and field of view are changed, while no complicated mechanism is required to move the display to maintain focus because the display remains at the focal plane of the eyepiece lens.

The present invention has been described above in terms of presently preferred embodiments so that an understanding of the present invention can be conveyed. There are, however, many configurations for viewfinders not specifically described herein, but with which the present invention is applicable. The present invention should therefore not be seen as limited to the particular embodiments described herein, but rather, it should be understood that the present invention has wide applicability with respect to viewfinders generally. All modifications, variations, or equivalent arrangements that are within the scope of the attached claims should therefore be considered to be within the scope of the invention.

I claim:

1. A real image viewfinder for use in a camera, the viewfinder having an objective lens, an image reflecting optic unit having first, second, third, and fourth reflecting surfaces, and an eyepiece lens that define a first optical path in which a first real image plane is located between the objective lens and the eyepiece lens, further having a movable variator lens that varies the magnification of the viewfinder as the variator lens is moved, wherein:

the second and third reflecting surfaces of the image reflecting optic unit are movable to compensate for variation in the position of the first real image plane with respect to the eyepiece lens such that the first real image plane moves simultaneously with movement of the second and third reflecting surfaces and the fourth reflecting surface is adapted to define a second optical path through the viewfinder such that a second real image plane is fixedly located at a focal plane of the eyepiece lens and can be viewed through the eyepiece lens, said real image viewfinder further including a display, located at the second real image plane, that displays data items that can be viewed through the eyepiece lens.

2. A real image viewfinder as defined in claim 1, wherein the fourth reflecting surface is a stationary semi-transparent reflecting surface that permits the second optical path to extend from the eyepiece lens through the semi-transparent reflecting surface to the second real image plane in an undeviated, straight line-of-sight path.

3. A real image viewfinder as defined in claim 1, wherein the fourth reflecting surface is sized sufficiently to permit the second optical path to extend in an undeviated, straight line-of-sight path from the eyepiece lens outside the viewfinder field-of-view to the second real image plane.

4. A real image viewfinder as defined in claim 1, wherein the display includes a transparent film layer that is solely illuminated by light passing through the viewfinder along the second optical path.

5. A real image viewfinder for use in a camera, the viewfinder having an objective lens, an image reflecting optic unit having first, second, third, and fourth reflecting surfaces, and an eyepiece lens that define a first optical path in which a first real image plane is located between the objective lens and the eyepiece lens, further having a movable variator lens that varies the magnification of the viewfinder as the variator lens is moved, wherein:

the second and third reflecting surfaces of the image reflecting optic unit are movable to compensate for variation in the position of the first real image plane with respect to the eyepiece lens such that the first real image plane moves simultaneously with movement of the reflecting surfaces and the fourth reflecting surface is adapted to define a second optical path through the viewfinder such that a second real image plane is fixedly located at the focal plane of the eyepiece lens and can be viewed through the eyepiece lens, wherein the image reflecting optic unit comprises a prism assembly and the fourth reflecting surface of the prism assembly is truncated relative to the first, second, and third reflecting surfaces of the prism assembly sufficiently to permit the second optical path to extend in an undeviated, straight line-of-sight path from the eyepiece lens outside the viewfinder field-of-view to the second real image plane.

* * * * *